US009345121B2

(12) United States Patent
Vahidpour et al.

(10) Patent No.: US 9,345,121 B2
(45) Date of Patent: May 17, 2016

(54) WAVEGUIDE-BASED APPARATUS FOR EXCITING AND SUSTAINING A PLASMA

(71) Applicant: AGILENT TECHNOLOGIES, INC., Loveland, CO (US)

(72) Inventors: Mehrnoosh Vahidpour, Santa Clara, CA (US); Peter T. Williams, San Carlos, CA (US); Syed Zaidi, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 113 days.

(21) Appl. No.: 14/229,779

(22) Filed: Mar. 28, 2014

(65) Prior Publication Data
US 2015/0282289 A1 Oct. 1, 2015

(51) Int. Cl.
*B23K 10/00* (2006.01)
*H05H 1/30* (2006.01)
*H01J 49/26* (2006.01)
*G01J 3/443* (2006.01)
*H01P 3/127* (2006.01)

(52) U.S. Cl.
CPC *H05H 1/30* (2013.01); *G01J 3/443* (2013.01); *H01J 49/26* (2013.01); *H01P 3/127* (2013.01)

(58) Field of Classification Search
CPC ........... H01H 1/30; H01P 3/127; H01J 49/26; G01J 3/443
USPC .......... 219/121.43, 121.48, 121.52, 690, 691, 219/695
See application file for complete search history.

(56) References Cited

U.S. PATENT DOCUMENTS

| 4,721,933 | A | 1/1988 | Schwartz et al. |
| 4,812,790 | A | 3/1989 | Tatomir et al. |
| 5,010,351 | A | 4/1991 | Kelly |
| 6,417,625 | B1 * | 7/2002 | Brooks ............ H01J 37/32009 315/111.31 |
| 6,683,272 | B2 | 1/2004 | Hammer |
| 7,030,979 | B2 * | 4/2006 | Hammer ................ G01N 21/68 219/121.48 |
| 8,039,795 | B2 | 10/2011 | Mordehai et al. |
| 8,779,322 | B2 * | 7/2014 | Holber .............. H01J 37/32174 219/121.41 |
| 2009/0020009 | A1 | 1/2009 | Zakrzewski et al. |
| 2014/0062299 | A1 | 3/2014 | Hammer et al. |

OTHER PUBLICATIONS

A. Sotgiu et al. "Electric fields and losses in lumped element resonators for ESR spectroscopy", J. Phys. E: Sci. Instrum. 20 (1987) pp. 1487-1490.

(Continued)

*Primary Examiner* — Mark Paschall

(57) ABSTRACT

An apparatus includes an electromagnetic which supports propagation of an electromagnetic wave in a first direction between a first end thereof and a second end thereof, and an electromagnetic-field shaping structure within the electromagnetic waveguide. The electromagnetic-field shaping structure defines a channel extending from a first aperture in a first wall of the apparatus to a second aperture in a second, opposite, wall. The channel has an axis extending in a second direction which is nonparallel with the first direction. The distance between the first aperture and the second aperture in the second direction is less than the width of the interior region of the waveguide at the first and second ends thereof. In some embodiments, a plasma torch is disposed within the channel. The length of the torch closely matches its interaction region.

20 Claims, 13 Drawing Sheets

(56) References Cited

OTHER PUBLICATIONS

Michael R. Hammer, "A magnetically excited microwave plasma source for atomic emission spectroscopy with performance approaching that of the inductively coupled plasma", Spectrochimica Acta Part B 63 (2008), pp. 456-464.

Merdad Mehdizadeh, et al., "Loop-Gap Resonator: A Lumped Mode Microwave Resonant Structure", IEEE Transactions on Microwave Theory and Techniques, vol. MTT-31, No. 12, Dec. 1983, pp. 1059-1064.

W. N. Hardy et al., "Split-ring resonator for use in magnetic resonance from 200-2000 MHz", Rev. Sci. Instrum. 52(2), Feb. 1981, pp. 213-216.

Written Opinion of the International Searching Authority mailed Jun. 30, 2015 for corresponding PCT Application No. PCT/US2015/022092.

* cited by examiner

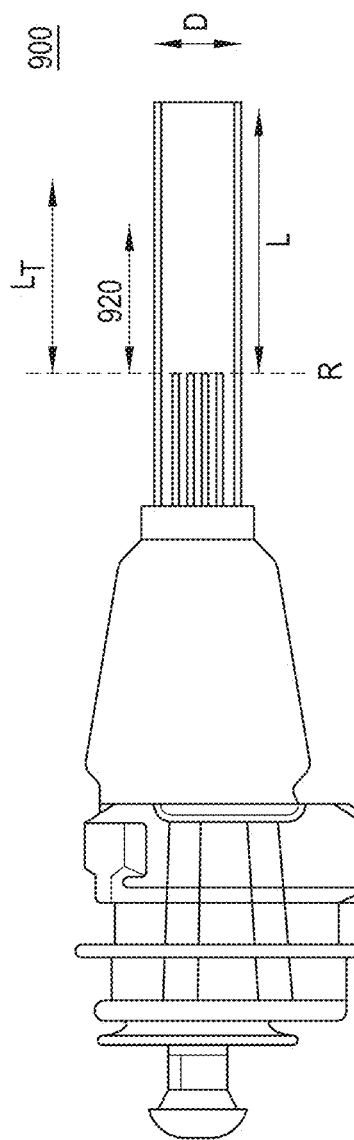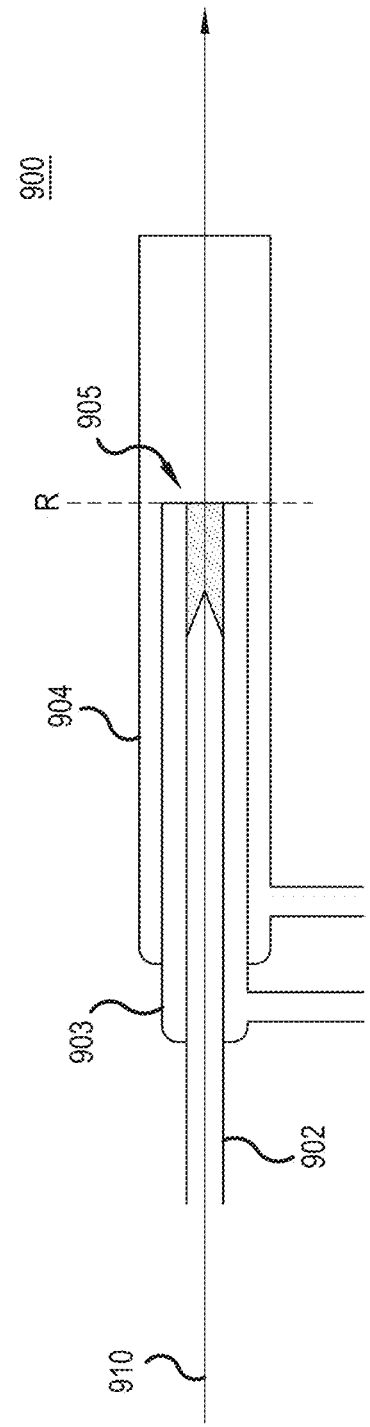
FIG.9A
FIG.9B

WAVEGUIDE-BASED APPARATUS FOR EXCITING AND SUSTAINING A PLASMA

BACKGROUND

Emission spectroscopy and mass spectrometry based on plasma sources is a well accepted approach to elemental analysis. It is desired that an electrical plasma suitable as an emission source for atomic spectroscopy of a sample should satisfy a number of criteria. The plasma should produce desolvation, volatilization, atomization and excitation of the sample. However the introduction of the sample to the plasma should not destabilize the plasma or cause it to extinguish.

One known and accepted plasma source for emission spectroscopy is a radio frequency (RF) inductively coupled plasma (ICP) source, typically operating at either 27 MHz or 40 MHz. In general, with an RF ICP source the plasma is confined to a cylindrical region, with a somewhat cooler central core. Such a plasma is referred to as a "toroidal" plasma. To perform spectroscopy of a sample with an RF ICP source, a sample in the form of an aerosol laden gas stream may be directed coaxially into this central core of the toroidal plasma.

Although such plasma sources are known and work well, they generally require the use of argon as the plasma gas. However, argon can be somewhat expensive and is not obtainable easily, or at all, in some countries.

Accordingly, there has been ongoing interest for many years in a plasma source supported by microwave power (for example at 2.45 GHz where inexpensive magnetrons are available).

However, at least until recently, atomic emission spectroscopy (AES) systems based on microwave plasma sources (also referred to as MP AES systems) have generally shown significantly worse detection limits than systems which employ an ICP source, and have often been far more demanding in their sample introduction requirements.

For optimum analytical performance of the emission spectroscopy system, it is thought that the plasma should be confined to a toroidal region, mimicking the plasma generated by an RF ICP source.

It has turned out to be much more difficult to produce such a toroidal plasma using microwave excitation than it is in the case of an RF ICP source. With an RF ICP source, a current-carrying coil, wound along the long axis of a plasma torch, is used to power the plasma. The coil produces a magnetic field which is approximately axially oriented with respect to the long axis of the plasma torch, and this, in turn, induces circulating currents in the plasma, and these currents are symmetrical about the long axis of the plasma torch. Thus, the electromagnetic field distribution in the vicinity of the plasma torch has inherent circular symmetry about the long axis of the plasma torch. So it is comparatively easy to produce a toroidal plasma with an RF ICP source.

However, the electromagnetic waveguides used to deliver power to microwave plasmas do not have this type of circular symmetry, and so it is much more difficult to generate toroidal microwave plasmas.

U.S. patent application Ser. Nos. 13/838,474 and 13/839,028 disclose some electromagnetic waveguide-based apparatuses for exciting and sustaining a plasma and which may produce a toroidal or quasi-toroidal plasma using a microwave plasma (MP) torch and a suitability configured waveguide cavity.

MP torches are usually made of fused silica or alumina and consist of three coaxial gas tubes, including an injector, and intermediate and outer tubes. While the outer tube provides the plasma gas, the analyte is carried into the plasma through the injector tube. As described in U.S. patent application Ser. Nos. 13/838,474 and 13/839,028, for example, the MP torch is positioned horizontally with respect to the width of a rectangular electromagnetic waveguide through two holes provided in the sidewalls of the electromagnetic waveguide which define the interior region or cavity of the electromagnetic waveguide. The electromagnetic waveguide cavity provides the required electromagnetic field to initiate and sustain plasma inside the MP torch.

Unlike the ICP torch, the length of which is not limited by any structural parameters, the length of the main plasma chamber of the MP torch must be equal to or longer than the width of the electromagnetic waveguide so that the plasma is confined inside the torch. In addition, the microwave power will generally be distributed across the width of the cavity or interior of the waveguide, so even if an MP torch which is shorter than the width of the electromagnetic waveguide was practically possible, only a portion of the microwave power in the electromagnetic waveguide would be coupled to the plasma. On the other hand, since the electromagnetic field intensity is negligible outside the electromagnetic waveguide, from a power coupling standpoint there is no point in elongating the torch to extend beyond the waveguide. Therefore, other considerations aside, it would appear that the torch and cavity are best suited to one another when the main plasma chamber of the MP torch is as long as the width of the electromagnetic waveguide cavity.

There is therefore a desire to provide an improved microwave plasma source which can provide improved performance which approaches that of RF ICP, together with characteristics such as small size, simplicity and relatively low operating costs.

BRIEF DESCRIPTION OF THE DRAWINGS

The various embodiments are best understood from the following detailed description when read with the accompanying drawing figures. Wherever applicable and practical, like reference numerals refer to like elements.

FIG. 9A is a side view of an example embodiment of a microwave plasma torch.

FIG. 9B is a cutaway cross-sectional diagram of an example embodiment of a microwave plasma torch.

DETAILED DESCRIPTION

Figure 1:
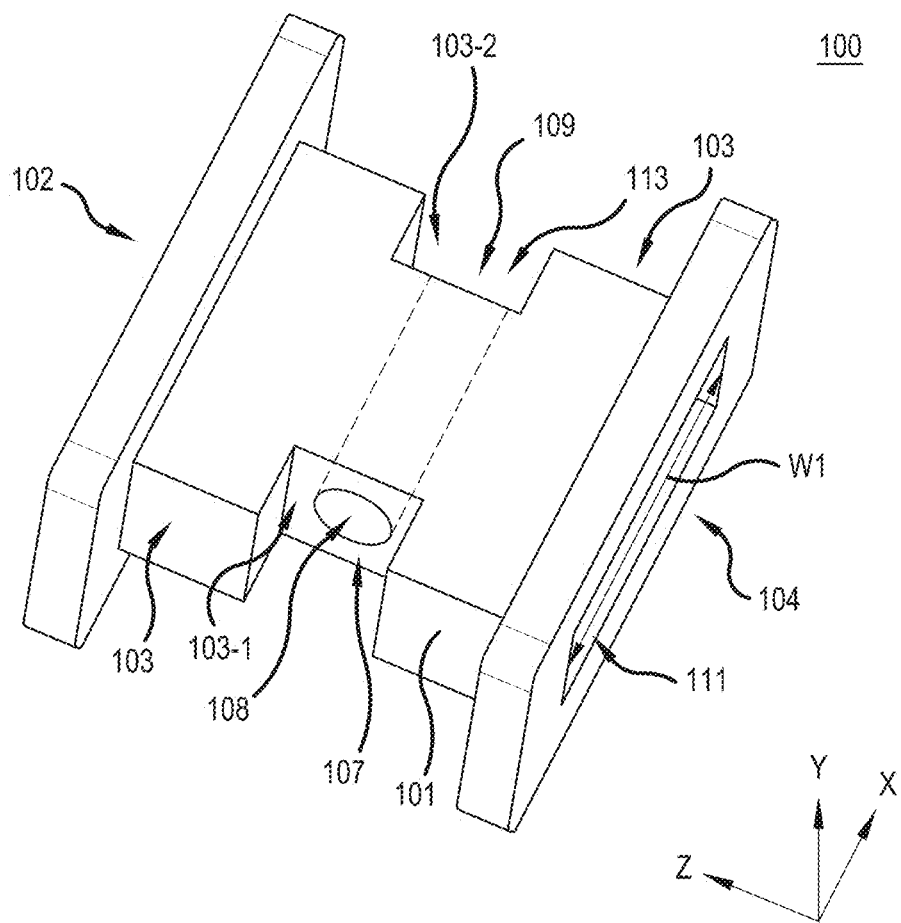
FIG. 1 is a perspective view of a portion of an apparatus according to a first example embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices. As used herein, the word "approximately" or substantially means within +/−10% of a nominal value (e.g., approximately 180 degrees would encompass angles from 164 degrees to 198 degrees; substantially reversed in direction means from a change in direction from 164 degrees to 198 degrees; etc.).

The present inventors have discovered and demonstrated that, from a hydrodynamics perspective, the MP torch in such a configuration is often longer than desirable. Most of the important physics appears to happen very close to the end of the injector (e.g., in the first 2-3 cm downstream of the injector), where the analyte interacts with the plasma, a region that is referred to herein as the "interaction region." Additional length of the MP torch beyond the interaction region necessarily means that the detector must be further away from the interaction region, which allows the plasma to cool between this hot interaction region and the detector, and allows greater radial turbulent diffusion of analyte to the MP torch walls. All of these effects are undesirable. Furthermore, the present inventors have come to appreciate that above and beyond mitigating these effects, MP torch performance would be greatly enhanced if one could focus more power at the interaction region itself, rather than distributing power over the full length of a long torch. For example, as a result of MP torch operation for a sufficient period of time, it has been observed that analyte coating appears on the walls of the outer tube of the MP torch. In most cases, the coating is asymmetric and appears near the exit end of the MP torch. The analyte coating on the walls of the outer tube is undesirable and can reduce the life of the MP torch. Furthermore, injector clogging is often observed as the analyte coats the inner and outer surfaces of the injector.

All these factors suggest that the width of the interior region or cavity of the electromagnetic waveguide should be reduced in order to accommodate a shorter MP torch whose length more closely matches its interaction region.

However, the width of the interior region of an electromagnetic waveguide is limited by the cut-off width of its fundamental mode. For example, at 2.45 GHz, the fundamental mode of the electromagnetic waveguide is in cut-off for widths below about 6.1 cm. In addition, a microwave operating at 2.45 GHz, for example, suffers from a high attenuation as the electromagnetic waveguide departs from the standard interior width of 7.2 cm (e.g., for a WR-284 waveguide). Thus it is not feasible to reduce the interior width of the full electromagnetic waveguide.

It would be desirable to provide an electromagnetic waveguide-based apparatus with an MP torch which may allow the width of the electromagnetic waveguide cavity in the region of the MP torch to more closely match the interaction region of the MP torch without attenuating the microwave within the electromagnetic waveguide beyond acceptable limits. In some cases, this may allow the use of a torch whose length has been reduced to more closely match its interaction region.

The present teachings relate generally to an apparatus including an electromagnetic waveguide for use with a microwave plasma (MP) torch to generate and sustain a plasma useful in spectrochemical analysis. The present inventors have conceived and produced novel electromagnetic-field shaping structures and configurations for an electromagnetic waveguide which may allow the width of the electromagnetic waveguide in the region of the MP torch to more closely match the interaction region of the MP torch without attenuating the microwaves within the electromagnetic waveguide beyond acceptable limits. In some embodiments, this may allow the use of an MP torch the length of which has been reduced to more closely match its interaction region. Herein the electromagnetic-field shaping structure is also referred to an iris structure, and it creates a region of discontinuity inside the electromagnetic waveguide that presents an impedance mismatch (a perturbation) that blocks or alters the shape of the pattern of an electromagnetic field in the electromagnetic waveguide. The electric field within the electromagnetic waveguide may be caused to experience a phase shift of 180 degrees across such an electromagnetic-field shaping structure, producing a reversal in direction of the electric field from the first side of the structure to the second side of the structure such that the electric field at the second side of the structure is in an opposite direction from the electric field at first side of the structure. By employing these configurations, in some embodiments a toroidal plasma may be generated. A more detailed explanation will be provided in connection with example embodiments illustrated in the attached drawings.

Figure 2:
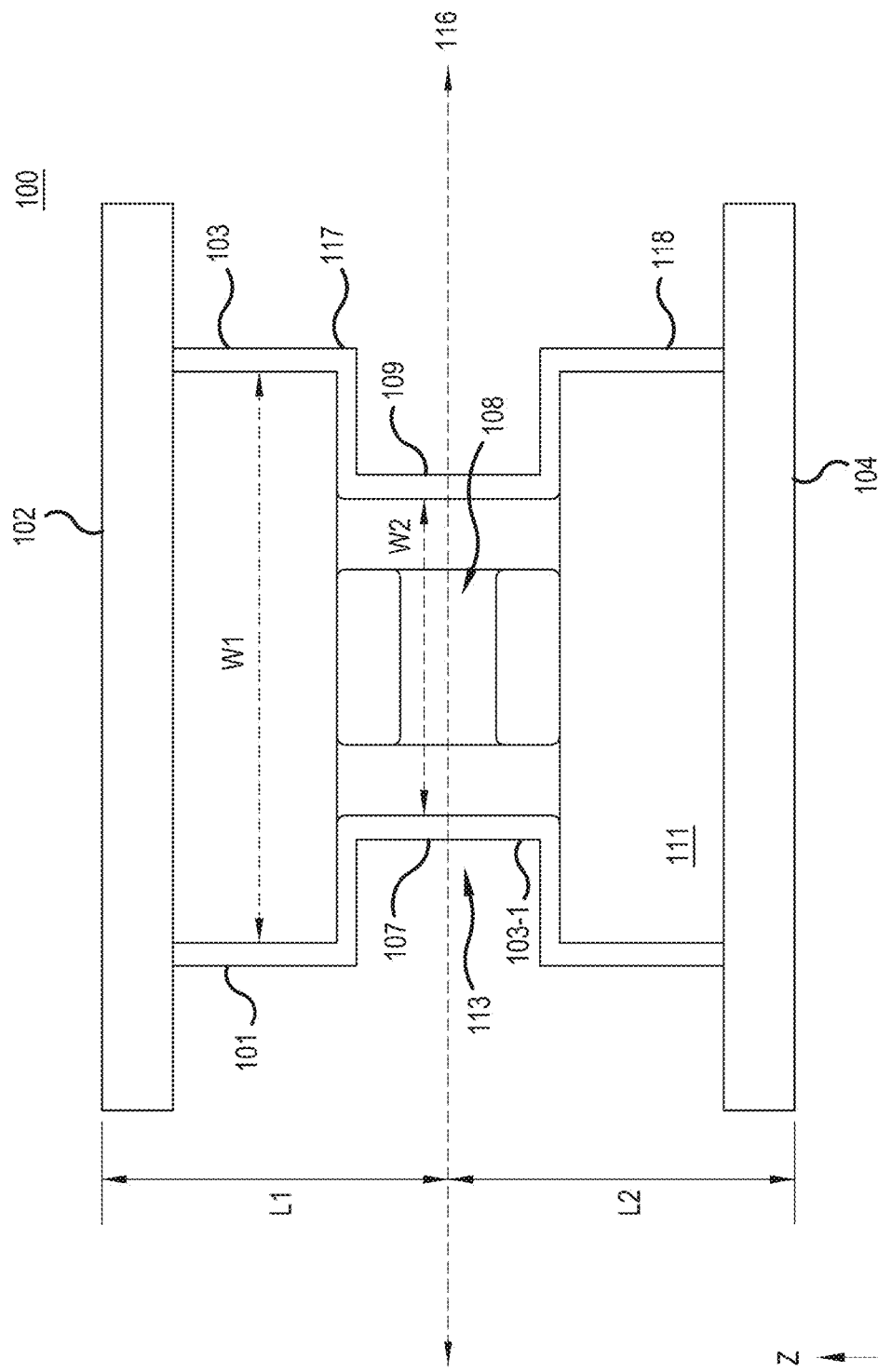
FIG. 2 is a top view of a portion of the apparatus according to the first example embodiment.

FIG. 1 is a perspective view of a portion of an apparatus 100 according to a first example embodiment. FIG. 2 is a top view of a portion of apparatus 100 according to the first example embodiment. Apparatus 100 may comprise an electromagnetic waveguide-based apparatus for exciting and sustaining a plasma.

To facilitate a better understanding of the description below, FIGS. 1, 2 and other drawings show a set of three orthogonal directions, x, y, and z, which together span a three-dimensional space. In the description below, the x, y, and z directions are designated "width," "height," and "length," respectively. Of course it should be understood that the assignment of the terms "width," "height," and "length" to the x, y, and z directions in this disclosure, respectively, is arbitrary and the terms could be assigned differently. To facilitate a better understanding of the embodiments disclosed herein, various combinations of the x, y, and z directions are shown in various drawings, but in all cases the directions are used consistently throughout the drawings.

Apparatus 100 comprises an electromagnetic waveguide ("waveguide") 101 having a first end 102 and a second end 104 which is separated and spaced apart from first end 102 along the z-direction to define the length of waveguide 101. Apparatus 100 includes a plurality of walls 103, including a first wall 103-1 and a second, opposite, wall 103-2, defining a cavity or interior region 111 which is configured to support a desired propagation mode ("mode") of an electromagnetic wave in a first direction (i.e., the z-direction) between first end 102 and second end 104 at a frequency suitable for generating and sustaining a plasma, and an iris structure (not shown in FIGS. 1 and 2—see FIGS. 3-8 below) defining an iris including a channel or iris hole 108 where an MP torch may be disposed at least partially within waveguide 101. Here, an iris is defined as a region of discontinuity inside waveguide 101 which presents an impedance mismatch (a perturbation) that blocks or alters the shape of the pattern of an electromagnetic field in the waveguide. In some embodiments, the iris can be produced by a reduction in the height and width of the interior of the waveguide. Further details regarding one or more embodiments of an iris structure will be described with respect to FIGS. 3-8 below.

As noted above, waveguide 101 is configured to support a desired mode of propagation (e.g., $TE_{10}$) within its interior region 111 at a microwave frequency (e.g., 2.45 GHz). Although the embodiment of waveguide 101 illustrated in FIG. 1 has a generally rectangular cross section across the direction of propagation (the z-direction), it will be understood that other waveguide shapes with other types of cross-sections are contemplated. In some embodiments of apparatus 100, in operation waveguide 101 is disposed adjacent to a source of microwave energy (not shown) at first end 102 thereof, and is short-circuited at second end 104.

Figure 3:
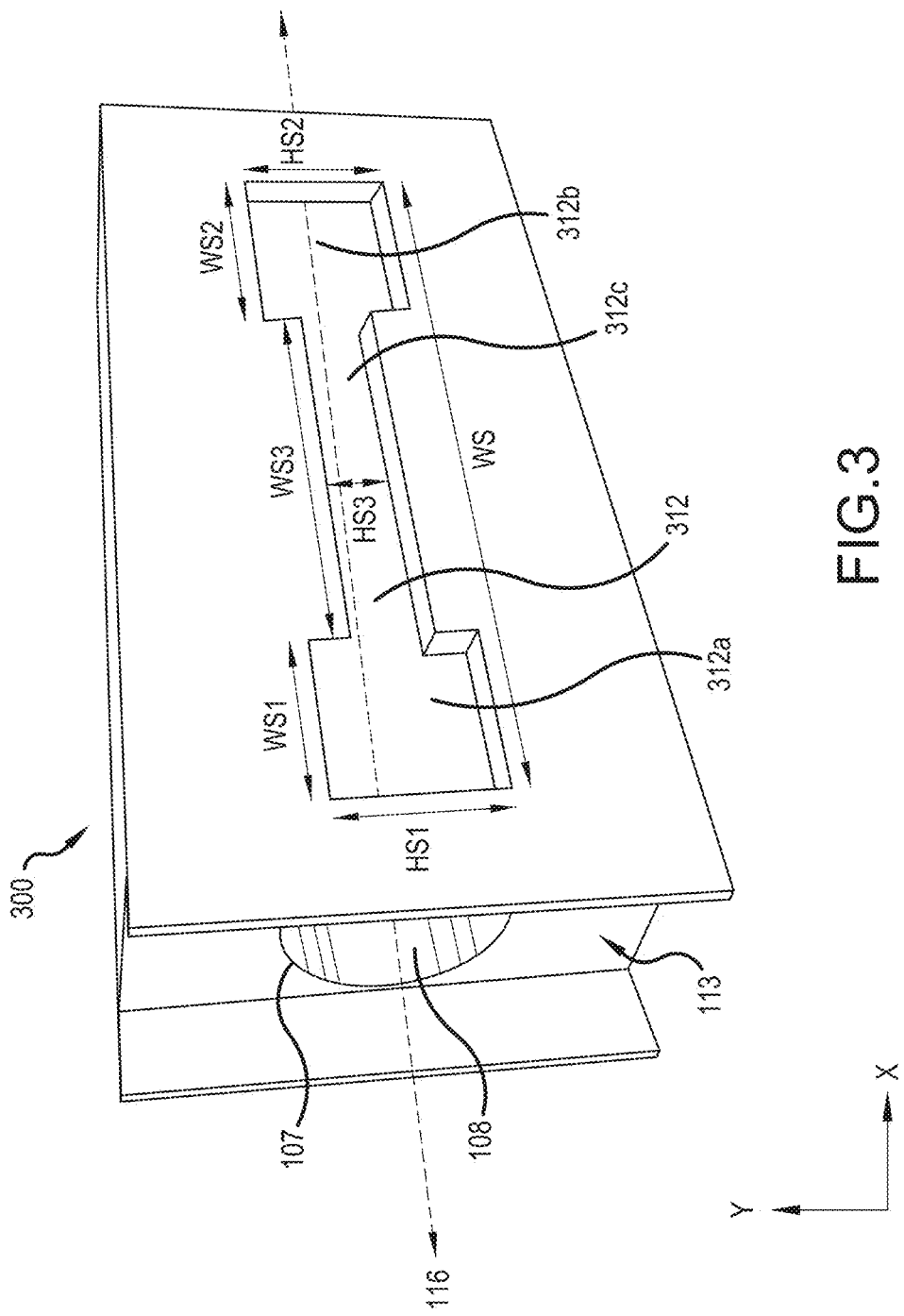
FIG. 3 is a perspective view of a first example embodiment of an electromagnetic-field shaping structure for a waveguide.
Figure 4:
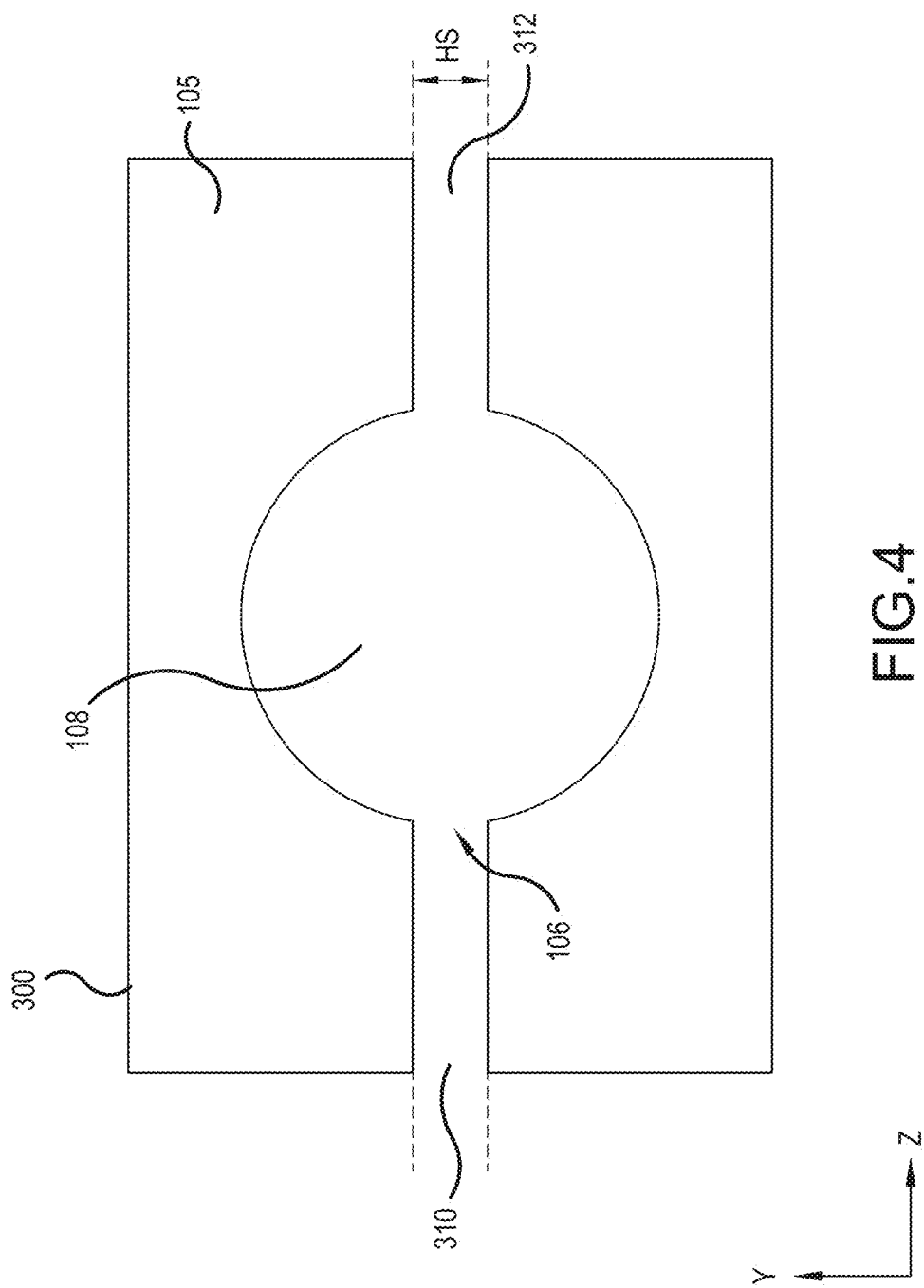
FIG. 4 is a cutaway cross-sectional view of the first example embodiment of an electromagnetic-field shaping structure for a waveguide.

FIG. 3 is a perspective view of an example embodiment of an electromagnetic-field shaping structure 300, referred to hereafter as "iris structure 300," which may be included in apparatus 100, and FIG. 4 is a cutaway cross-sectional view through a portion of iris structure 300. Iris structure 300 is one embodiment of an iris structure which may be employed in apparatus 100 to define an iris in waveguide 101.

In the embodiment illustrated in FIG. 4, iris structure 300 defines an iris 106 which includes a channel or iris hole 108 (referred to hereafter as "iris hole 108") extending in the x-direction between a first aperture 107 in first wall 103-1 of waveguide 101 and a second aperture 109 in second wall 103-2 of waveguide 101 which is opposite first wall 103-1. Iris structure 300 further defines a first slot ("first iris slot") 310 disposed at or along a first side of iris hole 108, between iris hole 108 and first end 102 of waveguide 101, and a second slot ("second iris slot") 312 disposed at or along a second side of iris hole 108, between iris hole 108 and second end 104 of waveguide 101. First and second iris slots 310 and 312 each define a passage through iris structure 300 along a direction from first end 102 of waveguide 101 to second end 104 of waveguide 101 (i.e., in the z-direction). First and second iris slots 310 and 312 are separated and spaced apart from each other in the z-direction. Iris slots 310 and 312 each have a width WS in the x-direction, and further have a height HS in the y-direction in the region where the cutaway view of FIG. 3 is taken. In general, first and second iris slots 310 and 312 may have the same size and shape as each other, or the sizes and/or shapes may be different from each other.

In one embodiment of an operation of waveguide 101 with electromagnetic-field shaping structure 300, an electromagnetic wave may propagate in the z-direction between first end 102 of waveguide 101 and second end 104 of waveguide 101, passing through first iris slot 310, iris hole 108, and second iris slot 312.

In the embodiment illustrated in FIGS. 2 and 3, iris hole 108 has a cylindrical shape, having a principal axis 116 of the cylinder extending in a second direction which is nonparallel with the direction of propagation of the electromagnetic wave (i.e., the z-direction). In the embodiment illustrated in FIGS. 2 and 3, iris hole 108 has a principal axis 116 which extends in the x-direction between first aperture 107 and second aperture 109, and has a substantially circular cross-section in a plane defined by the y-direction and z-direction. In other embodiments, iris hole 108 has a shape which is not cylindrical. For example, in some embodiments iris hole 108 may have the shape of a rectangular prism, a hexagonal prism, an octagonal prism, an oval cylinder, etc. In some embodiments, the iris hole 108 is symmetrical around an axis and has no sharp angles.

The center of the iris 106 (e.g. at principal axis 116) is disposed at a distance (represented as a first length L1 in FIG. 2) in the z-direction from first end 102 of waveguide 101. Moreover, the center of the iris 106 (e.g. at principal axis 116) is disposed a distance (represented as a second length L2 in FIG. 2) in the z-direction from second end 104 of waveguide 101. As such, iris 106 is positioned between a first section or portion 117 of the waveguide 101 and a second section or portion 118 of the waveguide 101. Notably, the waveguide 101 may be a single piece comprising first and second portions 117, 118 with iris 106 positioned therein. Alternatively, waveguide 101 may comprise two separate pieces (e.g., first and second portions 117, 118 being separate pieces) with iris 106 positioned therebetween.

In some embodiments, iris structure 300 which defines iris 106 may include a metal section having a thickness dimension along the length (z-direction) of waveguide 101, with a through-hole extending in the x-direction through the width of the metal section to define iris hole 108 which is configured to accommodate therein an MP torch (see FIGS. 9A-B and 10 discussed below). Waveguide 101 and iris structure 300 defining iris 106 in apparatus 100 are each made of a suitable electrically conductive material, such as a metal (e.g. aluminum) or metal alloy suitable for use at the selected frequency of operation of the apparatus 100. In some embodiments, iris structure 300 may be integral to waveguide 101. In other embodiments, iris structure 300 may be a separate structure inserted in waveguide 101, or between two separate portions 117 and 118 of waveguide 101. Certain aspects of waveguide 101 and iris 106 are common to the corresponding features described in commonly owned U.S. Pat. No. 6,683,272 to Hammer. The disclosure of U.S. Pat. No. 6,683,272 is specifically incorporated by reference herein.

As illustrated in FIGS. 1 and 2, in apparatus 100 the distance W2 in the X-direction between first aperture 107 and second aperture 109 is less than the width W1 of interior region 111 of waveguide 101 at first and second ends 102 and 104. For example, in some embodiments W2 may be approximately 7.2 cm, while W1 may be in a range of 2 cm to 3 cm. In some embodiments, the width of interior region 111 of waveguide 101 is W1>W2 everywhere except in at the position or location 113 where iris 106, including iris hole 108, is disposed or located. In some embodiments, and as discussed in more detail below with respect to FIGS. 9A-B and 10, the length of iris hole 108 may more closely match the interaction region of an MP torch which is inserted in iris hole 108.

Furthermore, as discussed in more detail below, the reduction in the width of the interior region of apparatus 100 in the vicinity of position 113 such that W2<W1 may be accomplished without attenuating the microwave within waveguide 101 beyond acceptable limits. In some embodiments, this may allow the use of an MP torch whose length has been reduced to more closely match its interaction region.

By making one or both of first and second iris slots 310 and 312 have a greater height at the ends thereof than in the middle, the electric field in apparatus 100 can be caused to experience a phase shift or change in direction from first iris slot 310 to second iris slot 312. In particular, the electric field may be caused to experience a phase shift of approximately 180 degrees—that is a reversal in direction from first iris slot 310 to second iris slot 312, such that the electric field at second iris slot 312 is in an opposite direction from the electric field at first iris slot 310.

Toward this end, in iris structure 300 the height (i.e., the size in the y-direction) of one or both of first and second iris slots 310 and 312 is greater at the ends of the iris slot than in the middle of the iris slot. In some embodiments, the height (i.e., the size in the y-direction) of both of first and second iris slots 310 and 312 is greater at the ends of the iris slot than in the middle of the iris slot.

Figure 5:
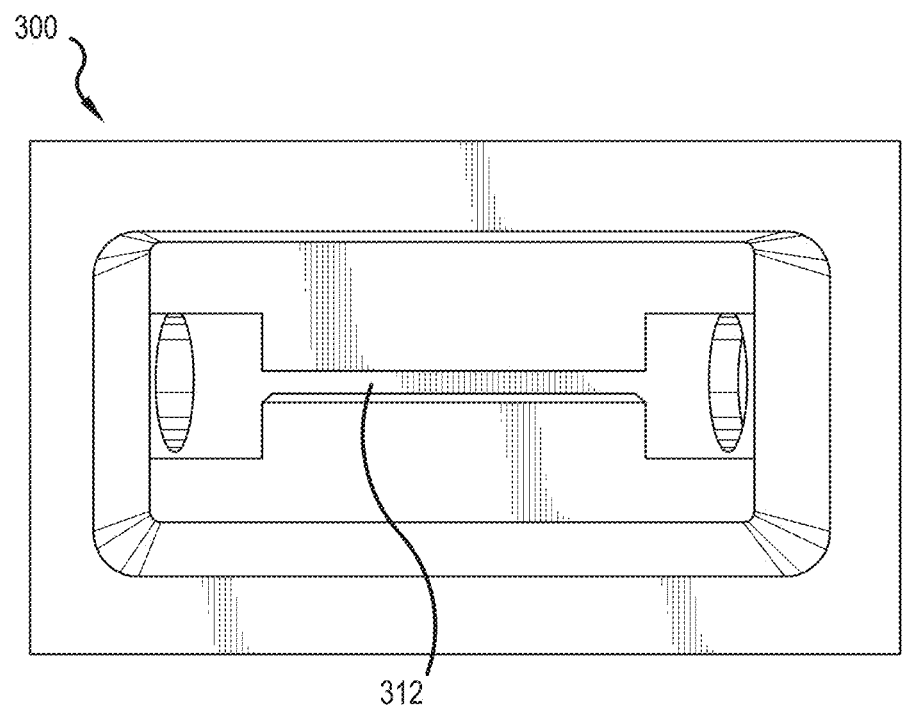
FIG. 5 is an end view of a portion of an interior region of an example embodiment of an apparatus including an iris structure.
Figure 5:
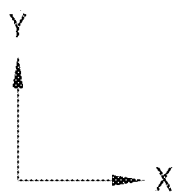

FIG. 5 is an end view of a portion of interior region 111 of apparatus 100, further illustrating an example shape of second iris slot 312 of iris structure 300. Here, it should be understood that first iris slot 310 may have the same shape as second iris slot 312 illustrated in FIGS. 4 and 5.

In the particular examples illustrated in FIGS. 3-6, second iris slot 312 has a shape which is like the cross-section of a so-called "double ridge" waveguide, and which is referred to herein as a "bowtie." Second iris slot 312 may be considered as being divided into three sections: a first end section 312a having a first width WS1 and a first height HS1; a second end section 312b having a second width WS2 and a second height HS2; and a central portion 312c disposed between first end section 312a and second end section 312b, wherein central portion 312c has a third width WS3 and a third height HS3. In some embodiments, first and second heights HS1 and HS2 may each be greater than third height HS3. In some embodiments, first and second heights H1 and H2 may be the same as each other. In some embodiments where HS1 equals HS2, the first and second heights HS1 and HS2 may be at least twice the third height HS3. In some embodiments the first and second heights HS1 and HS2 may be at least five times the third height HS3. In some embodiments, where WS1 equals WS2, a ratio of WS3 to WS1 is in a range of between about 2.5:1 to 3.5:1.

As described in greater detail below with respect to FIG. 11, the shape of first and second iris slot(s) 310 and/or 312 may cause the electric field to have opposite directions at opposite sides of iris 106, which generates an axial magnetic field (i.e., in the x-direction) inside iris hole 108. In some embodiments, the electric field distribution inside the plasma generated by an MP torch when disposed in iris hole 108 of iris 106 is circumferential, which is similar to that of an RF ICP source.

In some embodiments, the "bowtie" shape of iris slots 310 and 312 creates a bandpass filter at the microwave resonant frequency (e.g., at 2.45 GHz). Accordingly, a short-width version of iris 106 can be optimized to also provide a bandpass at the resonant frequency. With such a configuration, on the one hand iris 106 has a bandpass characteristic at the resonant frequency, so the wave is not evanescent, and on the other hand iris 106 can be optimized to generate a desired symmetric electromagnetic field distribution.

In general, the resonance frequency provided by the bowtie-shaped iris slots 310 and 312 is moved to higher frequencies (e.g., to 4 GHz) when the width of iris 106 in the x-direction is reduced (for example, reduced from W1 to W2). It is possible to move the resonance back to the desired frequency (e.g., 2.45 GHz) for waveguide 101 by scaling up the dimensions, which entails increasing the width, but in general this may not be desired.

In some embodiments, the change in resonance frequency as a result of reducing the width of waveguide 101 in the region of iris 106 may be compensated by effectively increasing the capacitance of iris slots 310 and 312. One way to increase the capacitance is to increase the length of iris slots 310 and 312.

Accordingly, in some embodiments, the resonance frequency is increased by providing a high dielectric material within one or both iris slots 310 and 312.

Figure 6:
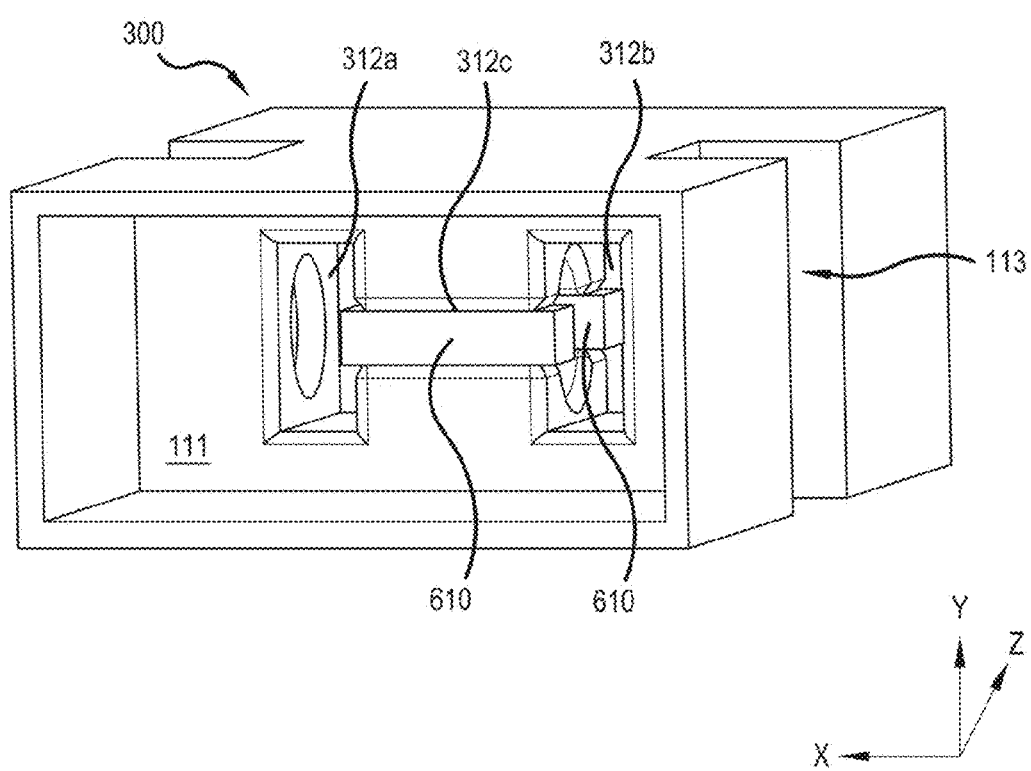
FIG. 6 is a perspective view of a portion of an interior region of an example embodiment of an apparatus including an iris structure.

FIG. 6 is a perspective view of a portion of an interior region of an example embodiment of an apparatus including an iris structure. FIG. 6 illustrates an embodiment wherein blocks 610 of a high dielectric material are provided in each of iris slots 310 and 312.

In the illustrated embodiment, blocks 610 of the high dielectric material are provided in both of iris slots 310 and 312, but in other embodiments, a block 610 of the high dielectric material may only be provided in one of iris slots 310 and 312. In the illustrated embodiment, blocks 610 of the high dielectric material are provided only in central portions of iris slots 310 and 312, but in other embodiments blocks 610 of the high dielectric material may be provided in the central and end portions (e.g., 312a and 312b) of iris slots 310 and 312. In some embodiments, for example depending upon the size of the dimensions of waveguide 101 and/or the operating frequency, blocks 610 of high dielectric material may be omitted altogether.

In some embodiments, the high dielectric material of block 610 may have a dielectric constant of at least 2, and more preferably a dielectric constant of at least 4. In some embodiments, blocks 610 are quartz blocks, which may be transparent to visible light. This is desirable in some apparatuses. In some embodiments, the dielectric material may comprise ceramic or alumina. In other embodiments, the dielectric material may comprise one or more of the following materials: silicon nitride, aluminum nitride, sapphire, silicon. The thickness of blocks 610 may be selected depending on the dielectric constant of the material. In general, a thinner material may be employed when the dielectric constant is greater, and a thicker material may be selected when the dielectric constant is less.

Figure 7:
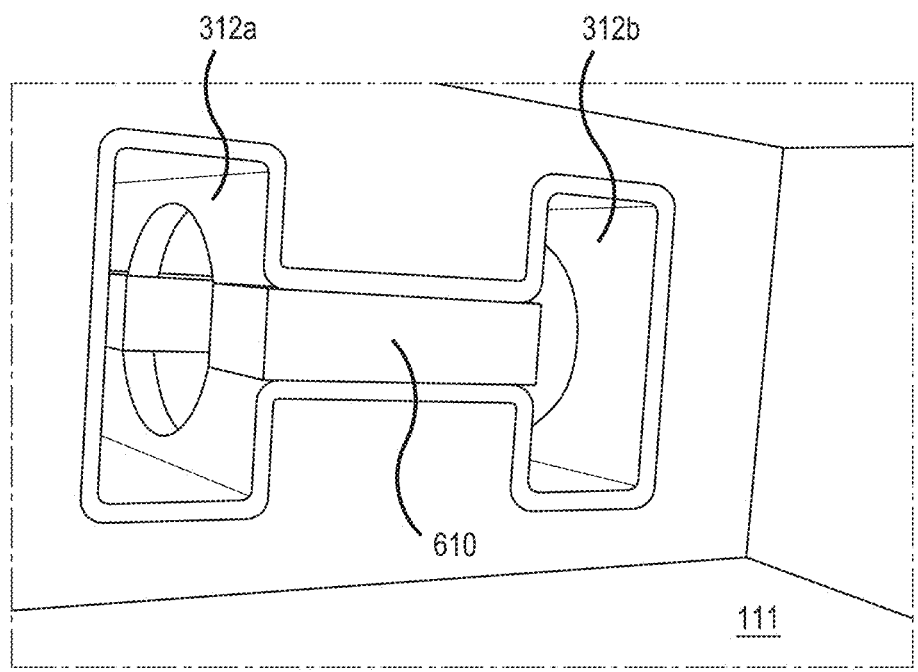
FIG. 7 is a close-up view of a portion of interior region of an example embodiment of an apparatus including an iris structure.

FIG. 7 is a close-up view of a portion of the interior region 111 of an example embodiment of an apparatus including an iris structure. FIG. 7 illustrates a block 610 of a high dielectric material provided in iris slot 312.

Figure 8:
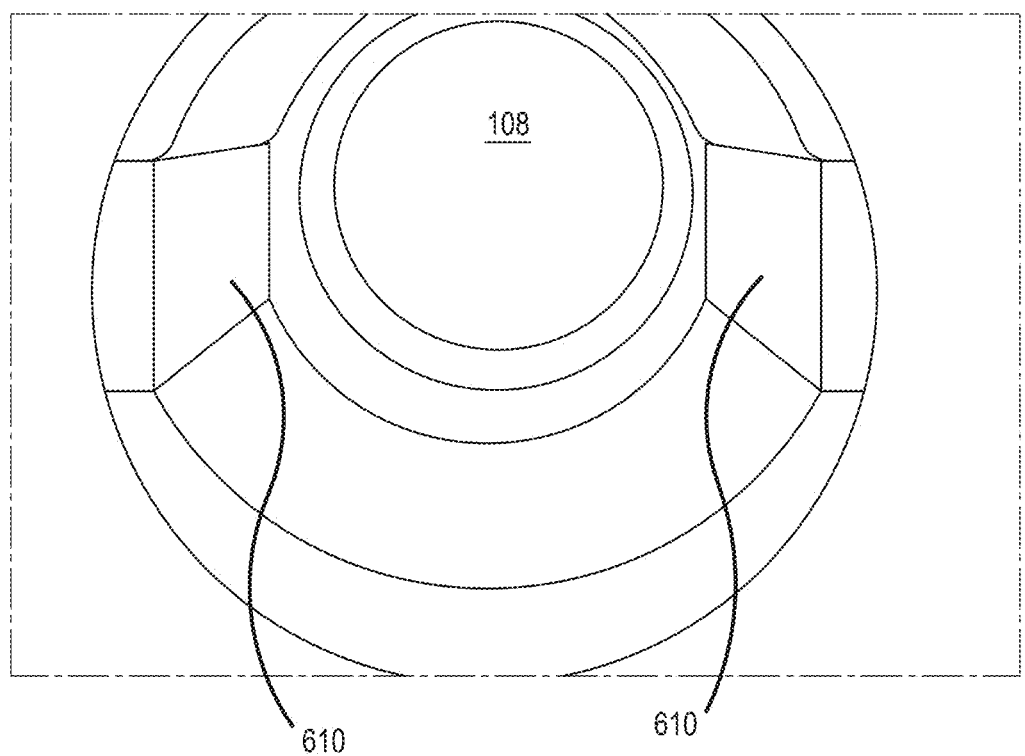
FIG. 8 is another close-up view of a portion of an interior region of an iris structure for defining an embodiment of an iris for a waveguide.

FIG. 8 is another close-up view of a portion of an interior region of an iris structure for defining an embodiment of an iris for a waveguide. FIG. 8 illustrates blocks 610 of a high dielectric material provided in iris slots 310 and 312.

As noted above, iris hole 108 may be configured to accommodate therein an MP torch. An MP torch is a device with a conduit or channel for delivering a plasma gas, which, upon contacting the electromagnetic waves, produces a plasma. The MP torch may also comprise a conduit or channel for delivering a sample in the form of an aerosol or gas to a location where plasma forms.

FIG. 9A is a side view of an example embodiment of a microwave plasma (MP) torch 900 which may be employed with apparatus 100, and FIG. 9B is a cutaway cross-sectional diagram of MP torch 900. MP torch 900 includes an injector 902, an inner tube 903, and an outermost tube 904 which are concentric with each other and each of which may be made of a non-conducting material, such as quartz or ceramic. The concentric tubes of MP torch 900 share a common central longitudinal axis 910 which, when MP torch 900 is inserted into iris hole 108 of apparatus 100, may be oriented in the x-direction in parallel to, or aligned with, the principal axis 116 of iris hole 108. When in operation, MP torch 900 has an interaction region 920, as defined above.

In some existing MP torches, the length L of the MP torch beyond the reference plane R at the end 905 of injector 902 extends well beyond the end of interaction region 920. For example, in some MP torches the length L may be about 7.2 cm, so as to extend across the width of a standard 2.45 GHz waveguide (e.g., a WR-284 waveguide), while interaction region 920 may be only 2 or 3 cm in length. As discussed above, this may lead to several shortcomings in the performance of an atomic emission spectrometer (AES) which employs such an MP torch. For example, optimal performance of MP torches is often found when the length of the interaction region is roughly 2 to 3 times the diameter of the torch.

Figure 10:
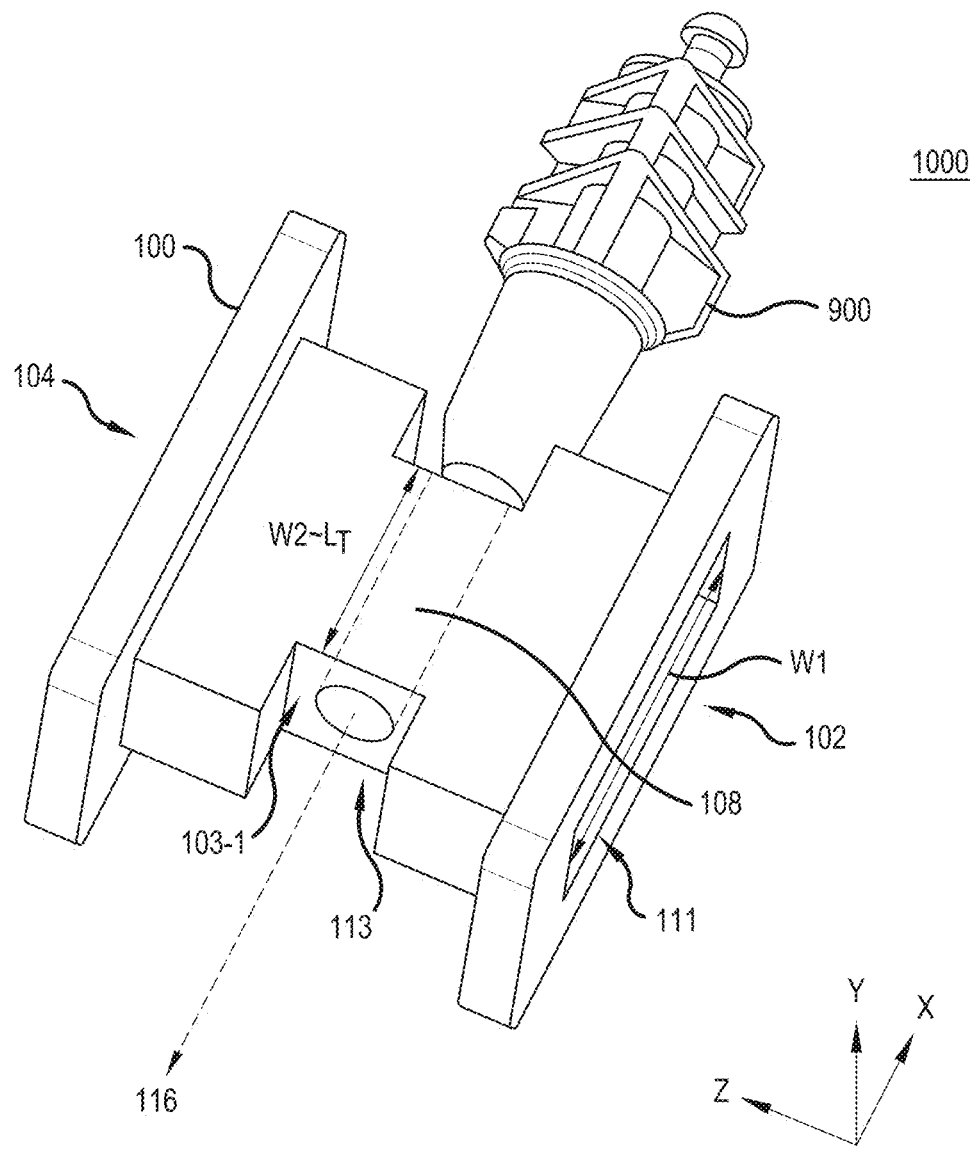
FIG. 10 is a perspective view of a portion of an example according to a second example embodiment.

FIG. 10 is a perspective view of a portion of an example embodiment of an apparatus 1000. Apparatus 1000 comprises apparatus 100, including an iris structure and iris hole 108 as described above, with MP torch 900 disposed therein.

In operation, when MP torch 900 is inserted into iris hole 108, a carrier gas with an entrained sample to be spectroscopically analyzed normally flows through injector 902, an intermediate gas flow is provided in inner tube 903, and a plasma-sustaining and torch-cooling gas flow is provided in outermost tube 904. In some embodiments, the plasma-sustaining and torch-cooling gas may be nitrogen. For example, the plasma-sustaining and torch-cooling gas may be nitrogen, and arrangements are provided for producing a flow of this gas conducive to form a stable plasma having a substantially hollow core, and to prevent MP torch 900 from becoming overheated. For example, in some embodiments the plasma-sustaining gas may be injected radially off-axis so that the flow spirals. That is, the flow streamlines in the annular inlets form helices that wrap around the axis of symmetry of MP torch 900, that being parallel to the x-axis. This gas flow sustains the plasma and the analytical sample carried in the inner gas flow is heated by radiation and conduction from the plasma. In some embodiments, for the purpose of initially igniting the plasma, the plasma-sustaining and torch-cooling gas flow may temporarily and briefly be changed: for example, from nitrogen to argon.

A more detailed description of an example embodiment of an MP torch is described in detail in commonly owned U.S. Pat. No. 7,030,979 to Hammer. The disclosure of U.S. Pat. No. 7,030,979 is specifically incorporated herein by reference.

As noted above, in apparatus 1000 the distance W2 between first aperture 107 and second aperture 109 in the x-direction is less than the width W1 of the interior region 111 of waveguide 101 at first and second ends 102 and 104. In some embodiments, the distance W2 matches, or approximately matches, the length of interaction region 920 of MP torch. Furthermore, the accompanying reduction in the width of apparatus 100 from W1 to W2 in the vicinity of MP torch 900 may be accomplished without attenuating the microwave within waveguide 101 beyond acceptable limits. In some embodiments, the reduction in the width of waveguide 101 from W1 to W2 in the vicinity of MP torch 900 may be accomplished with little or no attenuation of the microwave.

In some embodiments a length $L_T$ of a portion of MP 900 which is inserted in iris hole 108 may be the same as, or approximately the same as, the distance W2 between first aperture 107 and second aperture 109.

In some embodiments, this may allow the length of MP torch 900 to be reduced. For example, in some embodiments the length L illustrated in FIG. 9A may be reduced to $L_T$. In some embodiments, in operation the end of MP torch 900 may be substantially aligned with first aperture 107 in first wall 103-1 of waveguide 101 of apparatus 100.

As indicated above, a selected mode is supported in waveguide 101 when not perturbed. However, the iris 106 presents a perturbation that alters the wavelength and shape of the mode in the waveguide 101. By virtue of the structure of waveguide 101 and iris 106, a plasma may be generated and sustained in a desired shape.

In some embodiments, waveguide 101 may be configured to support a $TE_{10}$ propagation mode having a frequency in the microwave portion of the electromagnetic spectrum. For example, in some embodiments the selected mode may have a characteristic frequency of approximately 2.45 GHz. Notably, however, the embodiments described herein are not limited to operation at 2.45 GHz, and in general not limited to operation in the microwave spectrum. In particular, because the operational frequency range which is selected dictates the wavelength of the selected mode(s) of operation, and the operational wavelengths are primarily limited by the geometric sizes of MP torch 900 and waveguide 101, the operational frequency is also limited by the geometric size of MP torch 900 and waveguide 101. Illustratively, the present teachings can be readily implemented to include operational frequencies both higher and lower that 2.45 GHz. Furthermore, the desired mode is not limited to the illustrative $TE_{10}$ mode, and the waveguide 101 (or first and/or second portions 117, 118 depicted in FIG. 1) is not necessarily rectangular in shape. Other modes, or waveguide shapes, or both, are contemplated by the present disclosure.

Figure 11:
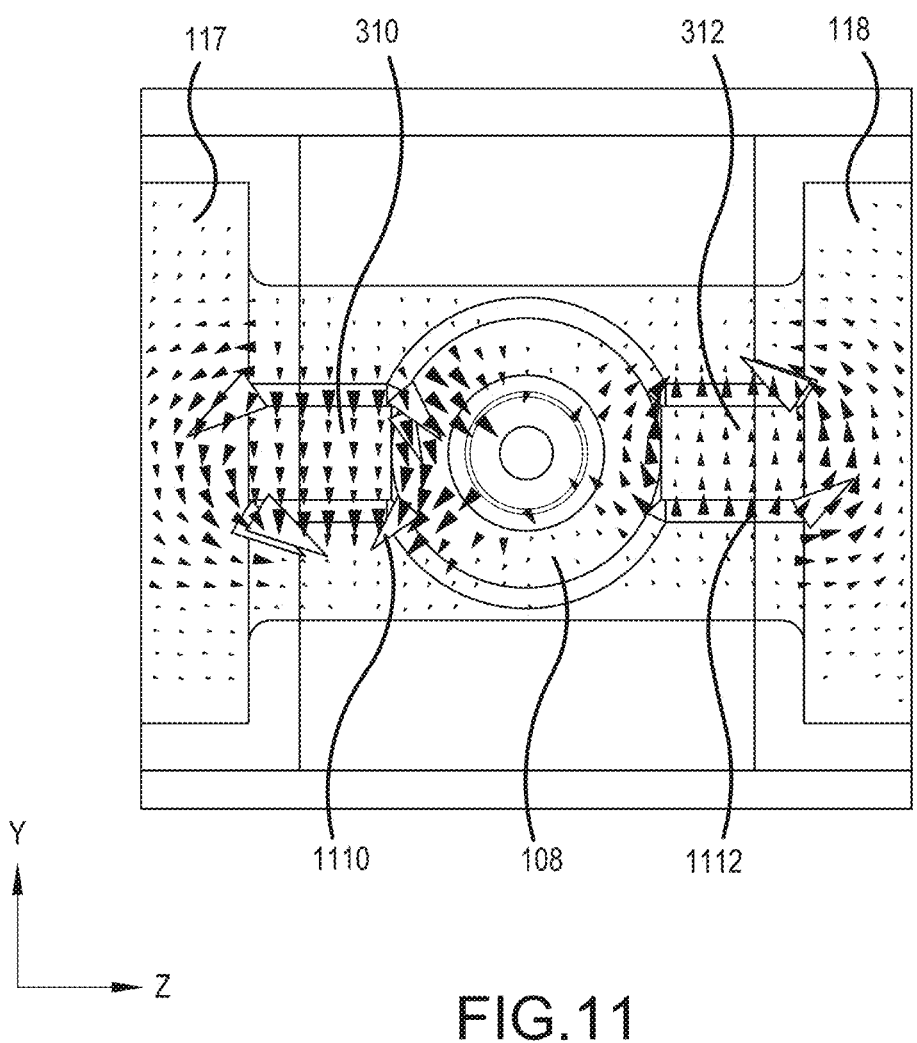
FIG. 11 is a side view depicting an example of electric field vectors of a desired mode in the region of an iris of an apparatus according to the second example embodiment.

FIG. 11 is a side view depicting an example of electric field lines 1110 of a desired mode in the region of iris 106, illustrating that the electric field lines 1110 are turned in direction around the interior of iris hole 108. Here it is seen that the first and second iris slots 310 and 312 are disposed at opposite sides of iris hole 108 in the z-direction (i.e., the direction of propagation for waveguide 101). In particular, the electric field lines 1110 at first iris slot 310 at a first side of iris hole 108 are oriented in the opposite direction from the electric field lines 1112 at second iris slot 312 at the second side of iris hole 108 which is opposite the first side of iris hole 108. That is, the iris structure 300 is configured to substantially reverse the direction of the electric field as the electromagnetic wave propagates across iris structure 300 (i.e., the direction of the electric field at first iris slot 310 on the first side of iris structure 300 is opposite, or at 180 degrees, with respect to the direction of the electric field at second iris slot 312 on the second side of iris structure 300.

Figure 12:
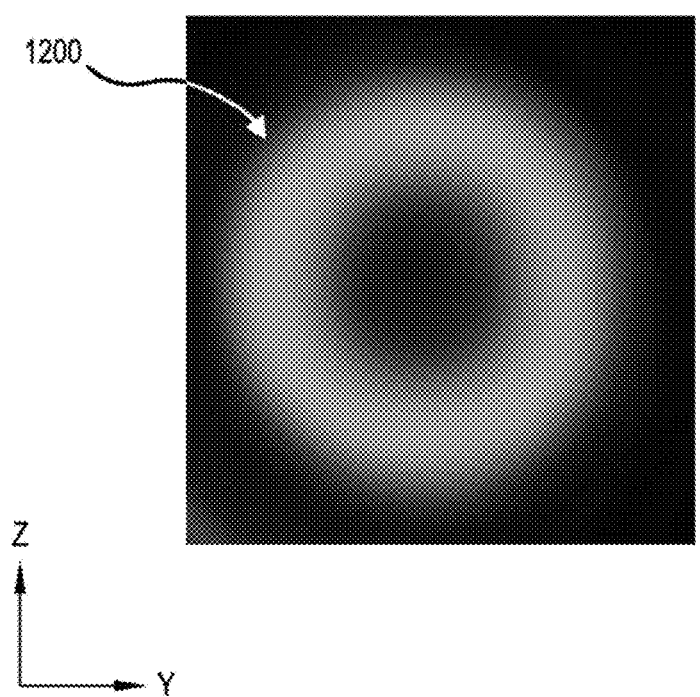
FIG. 12 is a cross-sectional view of an example of a plasma generated by apparatus according to the second example embodiment.

FIG. 12 is a cross-sectional view of an example of a plasma 1200 which may be generated by an example embodiment of apparatus 1000. Plasma 1200 is generally confined to a cylindrical space and may be referred to as a toroidal plasma.

Although FIG. 12 illustrates an example of a plasma having a substantially toroidal shape, in other embodiments a plasma having a different shape may be generated. In some embodiments, the plasma may be symmetrical, or substantially symmetrical, about central longitudinal axis 910 with a somewhat cooler central core—for example the plasma may be tubular, or substantially tubular, or have the shape of a hollow rectangular prism. Again, other plasma shapes are contemplated.

Figure 13A:
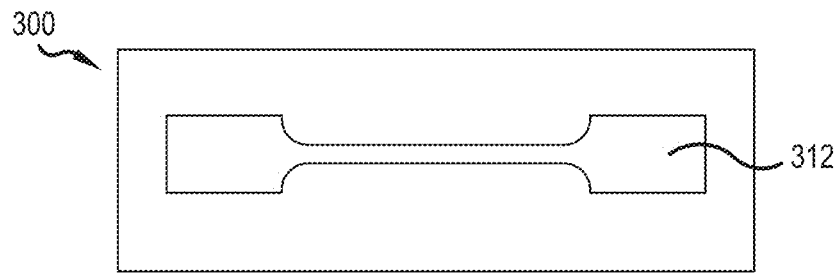
FIG. 13A is an end view illustrating one embodiment of a shape of an iris slot.
Figure 13B:
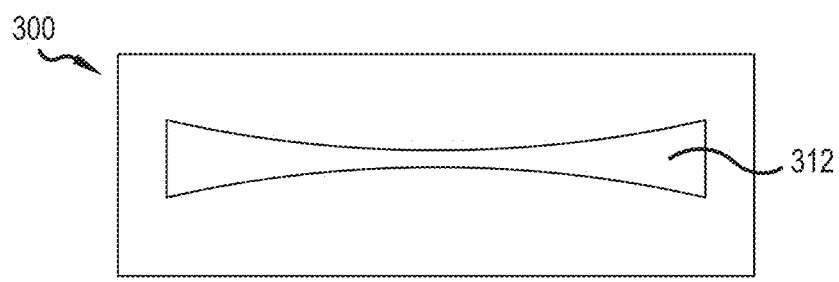
FIG. 13B is an end view illustrating another embodiment of a shape of an iris slot.
Figure 13C:
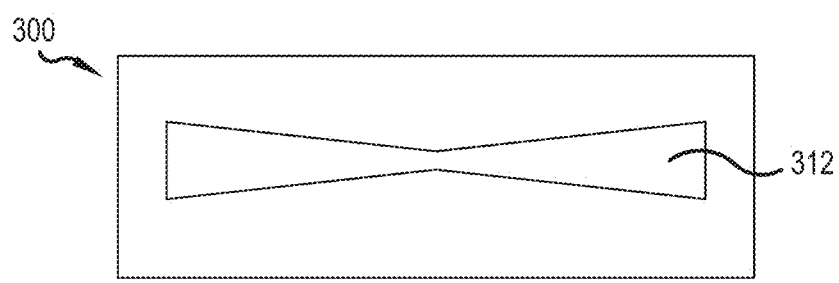
FIG. 13C is an end view illustrating another embodiment of a shape of an iris slot.
Figure 13D:
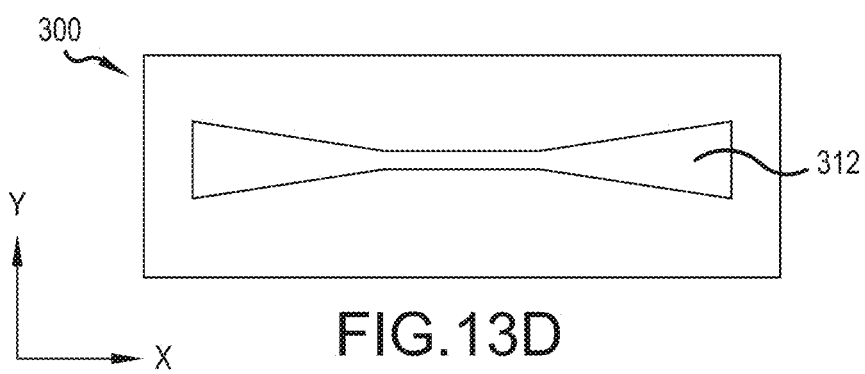
FIG. 13D is an end view illustrating another embodiment of a shape of an iris slot.

In the particular example embodiment illustrated in FIGS. 3 and 4, first and second iris slots 310 and 312 have the shape of a "bowtie," for example with rectangular first and second end sections 312a and 312b, and a rectangular central portion 312c disposed therebetween. However, it should be understood that in other variations of this embodiment, first and second iris slots 310 and/or 312 may have different shapes. FIGS. 13A-D illustrate a few examples of different shapes which first and second iris shot 310 and/or 312 may have. For example, FIG. 13A illustrates an embodiment where the transitions between the central portion of the iris slot and the end sections are curved. FIG. 13B illustrates an embodiment where the upper and lower edges of the iris slot are curved. FIG. 13C illustrates an embodiment where the iris slot has a height which linearly increases from the middle of the iris slot to each opposite end of the iris slot. FIG. 13D illustrates an embodiment where the first and second end sections of the iris slot are not rectangular, but instead have the shape of an isosceles trapezoid, with the short side of the trapezoid disposed adjacent the central section of the iris slot and the long end of the trapezoid being at the end of the iris slot.

Many variations of the example embodiments described above are possible. For example, although not present in the embodiments illustrated in FIGS. 1 and 10, in some embodiments a flange-like extension may be provided beneath first aperture 107, extending in the x-direction from the bottom of first wall 103-1, for mounting purposes. In some embodiments, another similar flange-like extension may be provided beneath second aperture 109, extending in the x-direction from second wall 103-2 on the opposite side of waveguide 101. Furthermore, features of the example embodiments may be combined to produce other embodiments.

Embodiments of a waveguide-based apparatus for exciting and sustaining a plasma as described above may be employed in various systems and for various applications, including but not limited to an atomic emission spectrometer (AES) for performing atomic emission spectroscopy or a mass spectrometer for performing mass spectrometry. In some embodiments, a spectrograph (e.g., an Echelle spectrograph) may be employed to separate atomized radiation emitted by the plasma into spectral emission wavelengths that are imaged onto a camera to produce spectral data, and a processor or computer may be employed to process and display and/or store the spectral data captured by the camera. In various embodiments, the apparatus may operate with gaseous and/or aqueous samples. In some embodiments, a waveguide-based apparatus for exciting and sustaining a plasma as described above may be employed in a gas chromatography system.

Exemplary Embodiments

In addition to the embodiments described elsewhere in this disclosure, exemplary embodiments of the present invention include, without being limited to, the following:

1. An apparatus, comprising:
an electromagnetic waveguide configured to support propagation of an electromagnetic wave in a first direction between a first end of the electromagnetic waveguide and a second end of the electromagnetic waveguide; and
an electromagnetic-field shaping structure within the electromagnetic waveguide, the electromagnetic-field shaping structure defining a channel therein extending from a first aperture in a first wall of the apparatus to a second aperture in a second, opposite, wall of the apparatus, the channel having an axis extending in a second direction which is nonparallel with the first direction,
wherein a distance between the first aperture and the second aperture in the second direction is less than a width of an interior region of the waveguide at the first end thereof and at the second end thereof.

2. The apparatus of embodiment 1, further comprising a plasma torch disposed within the channel.

3. The apparatus of embodiment 2, wherein the plasma torch extends through the channel from the first aperture to the second aperture.

4. The apparatus of any of the embodiments 2-3, wherein a first end of the plasma torch is substantially aligned with the first aperture.

5. The apparatus of any of the embodiments 2-4, wherein the apparatus is configured to generate a plasma in the channel, and wherein the plasma is substantially symmetrical around a longitudinal axis of the plasma torch.

6. The apparatus of embodiment 5, wherein the plasma has a substantially toroidal shape.

7. The apparatus of embodiment 5, wherein the plasma has a substantially tubular shape.

8. The apparatus of any of the embodiments 1-7, wherein the electromagnetic-field shaping structure is configured to substantially reverse a direction of an electric field as the electromagnetic wave propagates across the electromagnetic-field shaping structure.

9. The apparatus of any of the embodiments 1-8, wherein the electromagnetic-field shaping structure defines a first slot disposed at a first side of the channel between the channel and the first end of the waveguide, and a second slot disposed at a second side of the channel between the channel and the second end of the waveguide, each slot defining a passage through the electromagnetic-field shaping structure along a direction from the first end of the waveguide to the second end of the waveguide.

10. The apparatus of embodiment 9, wherein a height of at least one of the slots is greater at ends thereof than in a middle thereof.

11. The apparatus of any of the embodiments 9-10, wherein the height of each of the slots is greater at the ends thereof than in the middle thereof.

12. The apparatus of any of the embodiments 9-11, wherein at least one of the slots includes:
a first end section having a first height;
a second end section having a second height; and
a central portion disposed between the first end section and the second end section, wherein the central portion has a third height,
wherein the third height is less than the first height and less than the second height.

13. The apparatus of any of the embodiments 9-12, wherein each of the slots includes:
a first end section having a first height;
a second end section having a second height; and
a central portion disposed between the first end section and the second end section, wherein the central portion has a third height,
wherein the third height is less than the first height and less than the second height.

14. The apparatus of any of the embodiments 12-13, wherein the first end section has a first width, the second end section has a second width, and the central portion has a third width, wherein the first width is the same as the second width.

15. The apparatus of any of the embodiments 12-14, further comprising a dielectric material disposed in at least the central portion of at least one of the slots.

16. The apparatus of any of the embodiments 12-14, further comprising a dielectric material disposed in at least the central portion of each of the slots.

17. The apparatus of any of the embodiments 8-14, further comprising a dielectric material disposed in at least a portion of at least one of the slots.

18. The apparatus of any of the embodiments 8-14, further comprising a dielectric material disposed in each of the slots.

19. The apparatus of any of the embodiments 15-18 wherein the dielectric material has a dielectric constant of at least 2.

20. The apparatus of any of the embodiments 15-19 wherein the dielectric material comprises quartz.

21. The apparatus of any of the embodiments 15-20, wherein a length of the plasma torch is approximately the same as a length of the channel.

22. An atomic emission spectrometer comprising the apparatus of any of the embodiments 1-21.

23. A mass spectrometer comprising the apparatus of any of the embodiments 1-21.

24. A gas chromatography system comprising the apparatus of any of the embodiments 1-21.

25. A method, comprising:
disposing a plasma torch within an iris hole defined by an iris structure which provides an iris in an electromagnetic waveguide; and
generating an electromagnetic field, wherein an electric field in the waveguide changes direction from the first side of the iris to second side of the iris, wherein the first and second sides of the iris are on opposite sides of the iris from each other with respect to a propagation direction of the electromagnetic field,
wherein a width of the interior region of the waveguide at the position where the iris hole is disposed is less than a width of the interior region of the waveguide at the first end thereof and the second end thereof.

26. The method of embodiment 25, wherein the electric field at the second side of the iris is in an opposite direction from the electric field at first side of the iris.

27. The method of any of the embodiments 25-26, further comprising establishing an axial magnetic field extending along a longitudinal axis of the plasma torch.

28. The method of any of the embodiments 25-27, further comprising:
providing a plasma-forming gas to the plasma torch;
applying electromagnetic power to establish the electromagnetic field; and
generating a plasma.

29. The method of embodiment 28, wherein the plasma has a substantially toroidal shape.

30. The method of embodiment 28, wherein the plasma has a substantially tubular shape.

31. The method of any of the embodiments 25-30, further comprising introducing a sample to the plasma.

32. The method of embodiment 35, wherein the sample is aqueous.

33. The method of embodiment 35, wherein the sample is gaseous.

34. The method of any of the embodiments 31-33, further comprising performing mass spectrometry for the sample.

35. The method of any of the embodiments 31-33, further comprising performing atomic emission spectrometry for the sample.

36. The method of embodiment 33, further comprising performing gas chromatography for the sample.

A number of embodiments of the invention have been described. Nevertheless, one of ordinary skill in the art appreciates that many variations and modifications are possible without departing from the spirit and scope of the present invention and which remain within the scope of the appended claims. The invention therefore is not to be restricted in any way other than by the scope of the claims.

What is claimed is:

1. An apparatus, comprising:
an electromagnetic waveguide comprising a first end, a second end spaced from the first end along a first direction, and an interior region between the first end and the second end, wherein the electromagnetic waveguide is configured to support propagation of an electromagnetic wave in the first direction between the first end and the second end;
a first wall having a first aperture;
a second wall opposite to the first wall and having a second aperture, wherein the first wall and the second wall at least partially define the interior region along a second direction nonparallel with the first direction; and
an electromagnetic-field shaping structure within the electromagnetic waveguide, the electromagnetic-field shaping structure defining a channel therein extending from the first aperture to the second aperture, the channel having an axis extending in the second direction,
wherein a distance between the first aperture and the second aperture in the second direction is less than a width of the interior region in the second direction both at the first end and at the second end.

2. The apparatus of claim 1, further comprising a plasma torch disposed within the channel.

3. The apparatus of claim 2, wherein the plasma torch extends through the channel from the first aperture to the second aperture.

4. The apparatus of claim 2, wherein a first end of the plasma torch is substantially aligned with the first aperture.

5. The apparatus of claim 2, wherein the apparatus is configured to generate a plasma in the channel, and wherein the plasma is substantially symmetrical around a longitudinal axis of the plasma torch.

6. The apparatus of claim 5, wherein the plasma has one of: a substantially toroidal shape, and a substantially tubular shape.

7. The apparatus of claim 1, wherein the electromagnetic-field shaping structure is configured to substantially reverse a direction of an electric field as the electromagnetic wave propagates across the electromagnetic-field shaping structure.

8. The apparatus of claim 1, wherein the electromagnetic-field shaping structure defines a first slot disposed at a first side of the channel between the channel and the first end of the waveguide, and a second slot disposed at a second side of the channel between the channel and the second end of the electromagnetic waveguide, each slot defining a passage through the electromagnetic-field shaping structure along the first direction.

9. The apparatus of claim 8, wherein a height of at least one of the slots is greater at ends thereof than in a middle thereof.

10. The apparatus of claim 9, wherein the height of each of the slots is greater at the ends thereof than in the middle thereof.

11. The apparatus of claim 8, wherein at least one of the slots includes:
a first end section having a first height;
a second end section having a second height; and a central portion disposed between the first end section and the second end section, wherein the central portion has a third height, wherein the third height is less than the first height and less than the second height.

12. The apparatus of claim 11, wherein the first end section has a first width, the second end section has a second width, and the central portion has a third width, wherein the first width is the same as the second width.

13. The apparatus of claim 12, further comprising a dielectric material disposed in at least the central portion of at least one of the slots.

14. The apparatus of claim 8, further comprising a dielectric material disposed in at least a portion of at least one of the slots.

15. The apparatus of claim 13, wherein the dielectric material has a dielectric constant of at least 2.

16. The apparatus of claim 13, wherein the dielectric material is quartz.

17. The apparatus of claim 1, wherein the apparatus is an atomic emission spectrometer.

18. The apparatus of claim 1, wherein the apparatus is a mass spectrometer.

19. The apparatus of claim 1, wherein the apparatus is a gas chromatography system.

20. The apparatus of claim 1, wherein:

the interior region comprises a first section adjacent to the first end and extending between the first wall and the second wall along the second direction, and a second section adjacent to the second end and extending between the first wall and the second wall along the second direction;

the channel is positioned between the first section and the second section, relative to the first direction; and the distance between the first aperture and the second aperture in the second direction is less than a width of the interior region in the second direction both at the first section and at the second section.

* * * * *

UNITED STATES PATENT AND TRADEMARK OFFICE
CERTIFICATE OF CORRECTION

PATENT NO. : 9,345,121 B2
APPLICATION NO. : 14/229779
DATED : May 17, 2016
INVENTOR(S) : Mehrnoosh Vahidpour et al.

It is certified that error appears in the above-identified patent and that said Letters Patent is hereby corrected as shown below:

Title Page, item (57), in column 2, in "Abstract", lines 7-8, delete "second, opposite, wall." and insert -- second opposite wall. --, therefor.

In the specification

In column 5, line 10, delete "second, opposite," and insert -- second opposite --, therefor.

In the claims

In column 12, line 1, delete "second, opposite," and insert -- second opposite --, therefor.

Signed and Sealed this
Second Day of August, 2016

Michelle K. Lee
*Director of the United States Patent and Trademark Office*